United States Patent
Yuan et al.

(10) Patent No.: US 8,941,950 B2
(45) Date of Patent: Jan. 27, 2015

(54) UNDERLAYERS FOR HEAT ASSISTED MAGNETIC RECORDING (HAMR) MEDIA

(75) Inventors: Hua Yuan, Fremont, CA (US); Antony Ajan, Santa Clara, CA (US); Alexander S. Chernyshov, San Jose, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/479,217

(22) Filed: May 23, 2012

(65) Prior Publication Data

US 2013/0314815 A1    Nov. 28, 2013

(51) Int. Cl.
G11B 5/73    (2006.01)
G11B 5/82    (2006.01)

(52) U.S. Cl.
USPC .......................................... 360/135; 428/831

(58) Field of Classification Search
CPC ............................. G11B 5/732; G11B 5/7325
USPC ................ 360/131–136; 428/800, 817–848.9
See application file for complete search history.

(56) References Cited

U.S. PATENT DOCUMENTS

| | | | |
|---|---|---|---|
| 5,800,931 A * | 9/1998 | Lee et al. ....................... 360/135 |
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |

(Continued)

FOREIGN PATENT DOCUMENTS

WO    WO2008030199    3/2008

OTHER PUBLICATIONS

Yang, et al., "Highly Ordered FePt L1o Thin Films with Small Grains RuAl Seed Layers", IEEE Transactions on Magnetics, vol. 47, No. 1, pp. 81-86, Jan. 2011, 6 pages.

(Continued)

*Primary Examiner* — Craig A. Renner (57) ABSTRACT

Various embodiments provide for a heat assisted magnetic recording (HAMR) media comprising: a magnetic recording layer; a barrier layer disposed under the magnetic recording layer; a first underlayer disposed under the barrier layer; and an amorphous seedlayer disposed under the first underlayer. For some embodiments, the recording medium may comprise: a magnetic recording layer including FePt alloy, a CoPt alloy, or a FePd alloy; a barrier layer including MgO, TiC, TiN, CrN, TiCN, β-WC, TaC, HfC, ZrC, VC, NbC, or NiO; a first underlayer including RuAl-oxide, NiAl, FeAl, AlMn, CuBe, or AlRe; or an amorphous seedlayer including a Cr—X alloy, where X comprises Al, B, C, Cu, Hf, Ho, Mn, Mo, Ni, Ta, Ti, V, W, or Ru.

7 Claims, 7 Drawing Sheets

(56) References Cited

U.S. PATENT DOCUMENTS

| | | | |
|---|---|---|---|
| 6,210,819 | B1 | 4/2001 | Lal et al. |
| 6,216,709 | B1 | 4/2001 | Fung et al. |
| 6,221,119 | B1 | 4/2001 | Homola |
| 6,248,395 | B1 | 6/2001 | Homola et al. |
| 6,261,681 | B1 | 7/2001 | Suekane et al. |
| 6,270,885 | B1 | 8/2001 | Hokkyo et al. |
| 6,274,063 | B1 | 8/2001 | Li et al. |
| 6,283,838 | B1 | 9/2001 | Blake et al. |
| 6,287,429 | B1 | 9/2001 | Moroishi et al. |
| 6,290,573 | B1 | 9/2001 | Suzuki |
| 6,299,947 | B1 | 10/2001 | Suzuki et al. |
| 6,303,217 | B1 | 10/2001 | Malhotra et al. |
| 6,309,765 | B1 | 10/2001 | Suekane et al. |
| 6,358,636 | B1 | 3/2002 | Yang et al. |
| 6,362,452 | B1 | 3/2002 | Suzuki et al. |
| 6,363,599 | B1 | 4/2002 | Bajorek |
| 6,365,012 | B1 | 4/2002 | Sato et al. |
| 6,381,090 | B1 | 4/2002 | Suzuki et al. |
| 6,381,092 | B1 | 4/2002 | Suzuki |
| 6,387,483 | B1 | 5/2002 | Hokkyo et al. |
| 6,391,213 | B1 | 5/2002 | Homola |
| 6,395,349 | B1 | 5/2002 | Salamon |
| 6,403,919 | B1 | 6/2002 | Salamon |
| 6,408,677 | B1 | 6/2002 | Suzuki |
| 6,426,157 | B1 | 7/2002 | Hokkyo et al. |
| 6,429,984 | B1 | 8/2002 | Alex |
| 6,432,563 | B1 * | 8/2002 | Zou et al. ............. 428/826 |
| 6,482,330 | B1 | 11/2002 | Bajorek |
| 6,482,505 | B1 | 11/2002 | Bertero et al. |
| 6,500,567 | B1 | 12/2002 | Bertero et al. |
| 6,528,124 | B1 | 3/2003 | Nguyen |
| 6,537,638 | B2 | 3/2003 | Do et al. |
| 6,548,821 | B1 | 4/2003 | Treves et al. |
| 6,552,871 | B2 | 4/2003 | Suzuki et al. |
| 6,565,719 | B1 | 5/2003 | Lairson et al. |
| 6,566,674 | B1 | 5/2003 | Treves et al. |
| 6,571,806 | B2 | 6/2003 | Rosano et al. |
| 6,572,989 | B2 | 6/2003 | Bian et al. |
| 6,607,842 | B2 | 8/2003 | Bian et al. |
| 6,628,466 | B2 | 9/2003 | Alex |
| 6,664,503 | B1 | 12/2003 | Hsieh et al. |
| 6,670,055 | B2 | 12/2003 | Tomiyasu et al. |
| 6,682,807 | B2 | 1/2004 | Lairson et al. |
| 6,683,754 | B2 | 1/2004 | Suzuki et al. |
| 6,730,420 | B1 | 5/2004 | Bertero et al. |
| 6,743,528 | B2 | 6/2004 | Suekane et al. |
| 6,759,138 | B2 | 7/2004 | Tomiyasu et al. |
| 6,778,353 | B1 | 8/2004 | Harper |
| 6,795,274 | B1 | 9/2004 | Hsieh et al. |
| 6,846,543 | B2 | 1/2005 | Bian et al. |
| 6,855,232 | B2 | 2/2005 | Jairson et al. |
| 6,857,937 | B2 | 2/2005 | Bajorek |
| 6,872,478 | B2 | 3/2005 | Bian et al. |
| 6,893,748 | B2 | 5/2005 | Bertero et al. |
| 6,899,959 | B2 | 5/2005 | Bertero et al. |
| 6,916,558 | B2 | 7/2005 | Umezawa et al. |
| 6,926,977 | B2 | 8/2005 | Osawa et al. |
| 6,939,120 | B1 | 9/2005 | Harper |
| 6,946,191 | B2 | 9/2005 | Morikawa et al. |
| 6,967,798 | B2 | 11/2005 | Homola et al. |
| 6,972,135 | B2 | 12/2005 | Homola |
| 7,004,827 | B1 | 2/2006 | Suzuki et al. |
| 7,006,323 | B1 | 2/2006 | Suzuki |
| 7,016,154 | B2 | 3/2006 | Nishihira |
| 7,019,924 | B2 | 3/2006 | McNeil et al. |
| 7,045,215 | B2 | 5/2006 | Shimokawa |
| 7,070,870 | B2 | 7/2006 | Bertero et al. |
| 7,090,934 | B2 | 8/2006 | Hokkyo et al. |
| 7,099,112 | B1 | 8/2006 | Harper |
| 7,105,241 | B2 | 9/2006 | Shimokawa et al. |
| 7,119,990 | B2 | 10/2006 | Bajorek et al. |
| 7,147,790 | B2 | 12/2006 | Wachenschwanz et al. |
| 7,161,753 | B2 | 1/2007 | Wachenschwanz et al. |
| 7,163,756 | B2 | 1/2007 | Yamamoto et al. |
| 7,166,319 | B2 | 1/2007 | Ishiyama |
| 7,166,374 | B2 | 1/2007 | Suekane et al. |
| 7,169,487 | B2 | 1/2007 | Kawai et al. |
| 7,174,775 | B2 | 2/2007 | Ishiyama |
| 7,179,549 | B2 | 2/2007 | Malhotra et al. |
| 7,184,139 | B2 | 2/2007 | Treves et al. |
| 7,196,860 | B2 | 3/2007 | Alex |
| 7,199,977 | B2 | 4/2007 | Suzuki et al. |
| 7,208,236 | B2 | 4/2007 | Morikawa et al. |
| 7,220,500 | B1 | 5/2007 | Tomiyasu et al. |
| 7,229,266 | B2 | 6/2007 | Harper |
| 7,239,970 | B2 | 7/2007 | Treves et al. |
| 7,241,517 | B2 | 7/2007 | Acharya et al. |
| 7,252,897 | B2 | 8/2007 | Shimokawa et al. |
| 7,277,254 | B2 | 10/2007 | Shimokawa et al. |
| 7,281,920 | B2 | 10/2007 | Homola et al. |
| 7,292,329 | B2 | 11/2007 | Treves et al. |
| 7,300,713 | B2 | 11/2007 | Bian et al. |
| 7,301,726 | B1 | 11/2007 | Suzuki |
| 7,302,148 | B2 | 11/2007 | Treves et al. |
| 7,305,119 | B2 | 12/2007 | Treves et al. |
| 7,314,404 | B2 | 1/2008 | Singh et al. |
| 7,320,584 | B1 | 1/2008 | Harper et al. |
| 7,329,114 | B2 | 2/2008 | Harper et al. |
| 7,375,362 | B2 | 5/2008 | Treves et al. |
| 7,420,886 | B2 | 9/2008 | Tomiyasu et al. |
| 7,425,719 | B2 | 9/2008 | Treves et al. |
| 7,471,484 | B2 | 12/2008 | Wachenschwanz et al. |
| 7,498,062 | B2 | 3/2009 | Calcaterra et al. |
| 7,531,485 | B2 | 5/2009 | Hara et al. |
| 7,537,846 | B2 | 5/2009 | Ishiyama et al. |
| 7,549,209 | B2 | 6/2009 | Wachenschwanz et al. |
| 7,569,490 | B2 | 8/2009 | Staud |
| 7,597,792 | B2 | 10/2009 | Homola et al. |
| 7,597,973 | B2 | 10/2009 | Ishiyama |
| 7,608,193 | B2 | 10/2009 | Wachenschwanz et al. |
| 7,632,087 | B2 | 12/2009 | Homola |
| 7,656,615 | B2 | 2/2010 | Wachenschwanz et al. |
| 7,682,546 | B2 | 3/2010 | Harper |
| 7,684,152 | B2 | 3/2010 | Suzuki et al. |
| 7,686,606 | B2 | 3/2010 | Harper et al. |
| 7,686,991 | B2 | 3/2010 | Harper |
| 7,695,833 | B2 | 4/2010 | Ishiyama |
| 7,722,968 | B2 | 5/2010 | Ishiyama |
| 7,733,605 | B2 | 6/2010 | Suzuki et al. |
| 7,736,768 | B2 | 6/2010 | Ishiyama |
| 7,736,769 | B2 | 6/2010 | Ajan |
| 7,755,861 | B1 | 7/2010 | Li et al. |
| 7,758,732 | B1 | 7/2010 | Calcaterra et al. |
| 7,833,639 | B2 | 11/2010 | Sonobe et al. |
| 7,833,641 | B2 | 11/2010 | Tomiyasu et al. |
| 7,910,159 | B2 | 3/2011 | Jung |
| 7,911,736 | B2 | 3/2011 | Bajorek |
| 7,924,519 | B2 | 4/2011 | Lambert |
| 7,944,165 | B1 | 5/2011 | O'Dell |
| 7,944,643 | B1 | 5/2011 | Jiang et al. |
| 7,955,723 | B2 | 6/2011 | Umezawa et al. |
| 7,983,003 | B2 | 7/2011 | Sonobe et al. |
| 7,993,497 | B2 | 8/2011 | Moroishi et al. |
| 7,993,765 | B2 | 8/2011 | Kim et al. |
| 7,998,912 | B2 | 8/2011 | Chen et al. |
| 8,002,901 | B1 | 8/2011 | Chen et al. |
| 8,003,237 | B2 | 8/2011 | Sonobe et al. |
| 8,012,920 | B2 | 9/2011 | Shimokawa |
| 8,038,863 | B2 | 10/2011 | Homola |
| 8,057,926 | B2 | 11/2011 | Ayama et al. |
| 8,062,778 | B2 | 11/2011 | Suzuki et al. |
| 8,064,156 | B1 | 11/2011 | Suzuki et al. |
| 8,076,013 | B2 | 12/2011 | Sonobe et al. |
| 8,092,931 | B2 | 1/2012 | Ishiyama et al. |
| 8,100,685 | B1 | 1/2012 | Harper et al. |
| 8,101,054 | B2 | 1/2012 | Chen et al. |
| 8,125,723 | B1 | 2/2012 | Nichols et al. |
| 8,125,724 | B1 | 2/2012 | Nichols et al. |
| 8,137,517 | B1 | 3/2012 | Bourez |
| 8,142,916 | B2 | 3/2012 | Umezawa et al. |
| 8,163,093 | B1 | 4/2012 | Chen et al. |
| 8,171,949 | B1 | 5/2012 | Lund et al. |
| 8,173,282 | B1 | 5/2012 | Sun et al. |
| 8,178,480 | B2 | 5/2012 | Hamakubo et al. |

(56) References Cited

U.S. PATENT DOCUMENTS

| | | |
|---|---|---|
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0031909 A1 | 2/2005 | Bian et al. |
| 2005/0036223 A1 | 2/2005 | Wachenschwanz et al. |
| 2005/0069730 A1 | 3/2005 | Doerner et al. |
| 2005/0089726 A1* | 4/2005 | Abarra ............... 428/694 TS |
| 2005/0142390 A1* | 6/2005 | Ajan et al. .......... 428/694 TS |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0227123 A1* | 10/2005 | Ajan ................... 428/832.1 |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0188752 A1* | 8/2006 | Gusliyenko ............. 428/827 |
| 2006/0207890 A1 | 9/2006 | Staud |
| 2006/0222896 A1 | 10/2006 | Inomata et al. |
| 2007/0020487 A1* | 1/2007 | Lim et al. ............... 428/836 |
| 2007/0070549 A1 | 3/2007 | Suzuki et al. |
| 2007/0218316 A1* | 9/2007 | Inomata ................. 360/131 |
| 2007/0245909 A1 | 10/2007 | Homola |
| 2008/0074776 A1 | 3/2008 | Soeya |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136782 A1 | 5/2009 | Lu |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0014191 A1* | 1/2010 | Kanazawa ............... 428/827 |
| 2010/0021770 A1 | 1/2010 | Hazanov et al. |
| 2010/0143752 A1 | 6/2010 | Ishibashi et al. |
| 2010/0159285 A1 | 6/2010 | Peng et al. |
| 2010/0178529 A1 | 7/2010 | Marinero |
| 2010/0182714 A1 | 7/2010 | Kanbe et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0011733 A1 | 1/2011 | Yang et al. |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0134049 A1* | 5/2012 | Maeda ................... 428/836 |
| 2012/0140359 A1 | 6/2012 | Tachibana |
| 2012/0141833 A1 | 6/2012 | Umezawa et al. |

(56) References Cited

U.S. PATENT DOCUMENTS

| | | |
|---|---|---|
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1* | 10/2012 | Yuan et al. .................. 428/800 |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Landdell et al. |
| 2014/0234666 A1 | 8/2014 | Knigge et al. |

OTHER PUBLICATIONS

Yang, et al., "Epitaxial Growth of L1o-FePt Granular Thin Films on TiC/RuAl Underlayers", IEEE Transactions on Magnetics, vol. 47, No. 10, pp. 4077-4079, Oct. 2011, 3 pages.

Shen, et al., "In situ epitaxial growth of ordered FePt (001) films with ultra small and uniform grain size using RuAl underlayer", Journal of Applied Physics 97, 10H301 (2005), 3 pages.

\* cited by examiner

-- Prior Art --

UNDERLAYERS FOR HEAT ASSISTED MAGNETIC RECORDING (HAMR) MEDIA

TECHNICAL FIELD

This invention relates to the field of disk drives and more specifically, to heat assisted magnetic recording media for disk drives.

BACKGROUND

Figure 1:
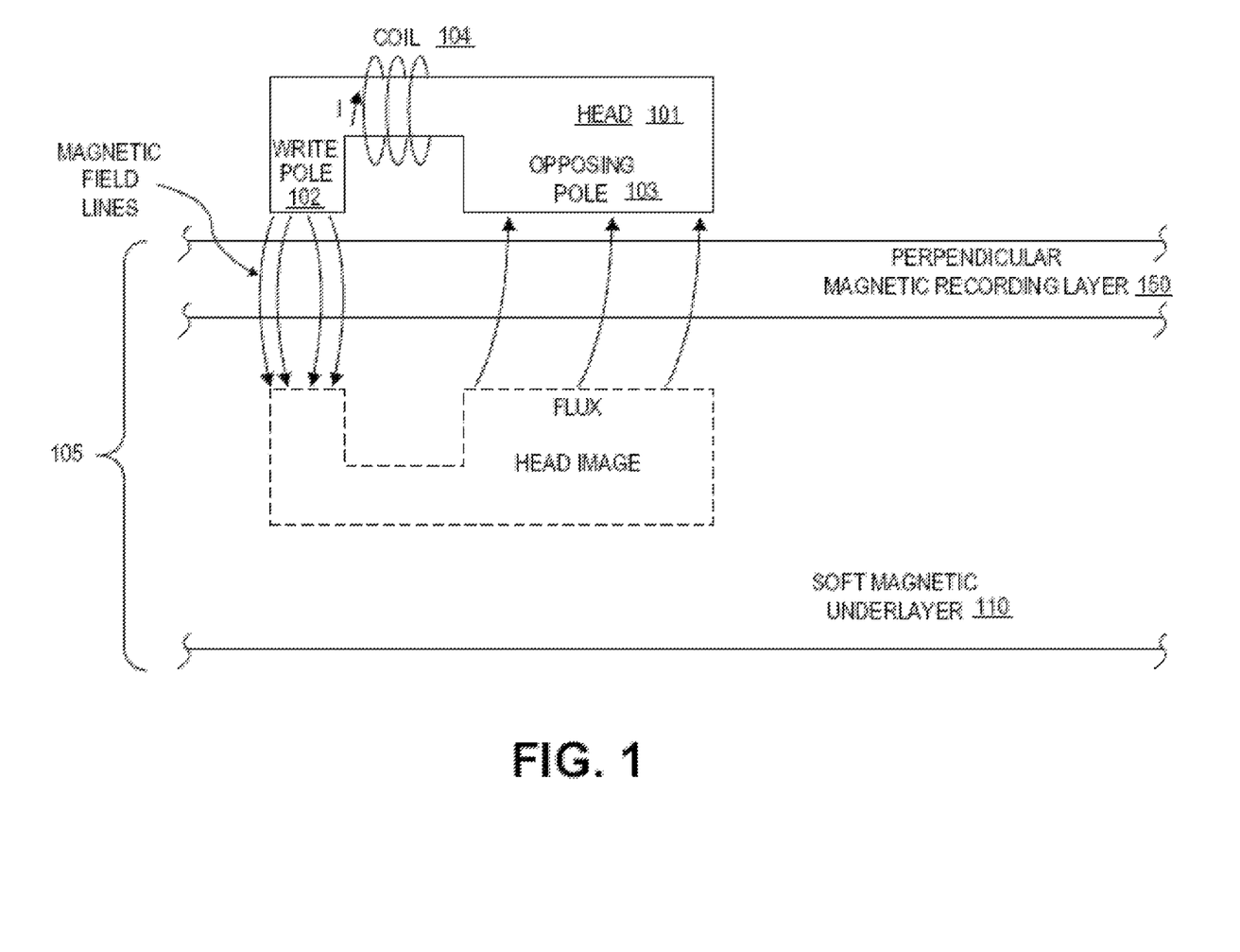
FIG. 1 (prior art) illustrates a conventional perpendicular recording disk drive system.

For all types of substrates, magnetic recording media has begun to incorporate perpendicular magnetic recording (PMR) technology in an effort to increase areal density and is now working toward areal densities of 800 Gbits/in$^2$. Generally, PMR media may be partitioned into two primary functional regions: a soft magnetic underlayer (SUL) and a magnetic recording layer(s) (RL). FIG. 1 illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

Typically, higher areal densities are typically achieved with well-isolated smaller grains in the PMR layer. A higher magnetocrystalline anisotropy constant ($K_u$) is typically required to resist the demagnetization effects of the perpendicular geometry and to keep the smaller grains thermally stable to reduce media noise. For example, smaller grain size (<7 nm) and high magnetocrystalline anisotropy ($K_u$) $L1_0$ ordered FePt media can achieve areal density beyond 1 Tb/in$^2$ magnetic recording.

With the advent of heat-assisted magnetic recording (HAMR) media, areal densities of 900 Gbits/in$^2$ and higher using PMR technology has been realized. This is because HAMR media comprises of a magnetic compound, such as a FePT alloy, that has a higher magnetic stability than PMR technology using non-HAMR media. However, because the HAMR media comprises of such higher-stability magnetic compounds, HAMR media requires that heat be applied to it before changes its magnetic orientation can be changed. Typically, when PMR technology magnetically records data to HAMR media, it first uses a heating element, such as a laser, to increase the temperature of the recording location on the media, in order to lower the location's high magnetic anisotropy constant ($K_u$) sufficiently to allow a change to its magnetic orientation (i.e., record data).

Figure 2:
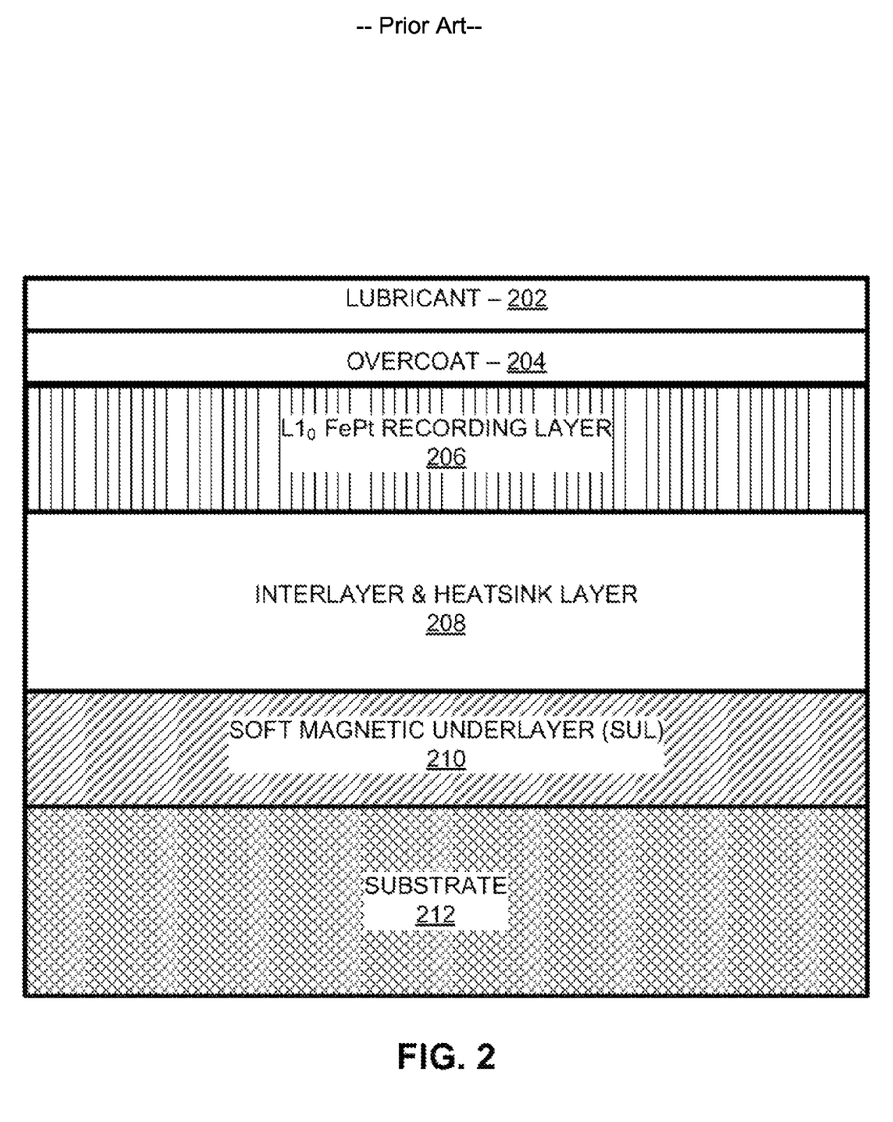
FIG. 2 (prior art) illustrates a cross-sectional view of an exemplary heat-assisted magnetic recording (HAMR) media.

FIG. 2 illustrates a cross-sectional view of an exemplary heat-assisted magnetic recording (HAMR) media comprising a hard magnetic recording layer 206, a soft magnetic underlayer (SUL) 210, a heatsink layer and non-magnetic interlayer 208 between the hard magnetic recording layer 206 and soft magnetic underlayer 210, and a bottom substrate 212. The hard magnetic recording layer 206 illustrated is a $L1_0$ layer made of iron platinum (FePt), a magnetic compound known to have a high magnetic anisotropy constant ($K_u$). Other suitable compounds for the hard magnetic layer include iron platinum alloys (FePtX), such as FePtCu, FePtAu, FePtAg, and FePtNi.

Disposed over the hard magnetic recording layer 206 are a capping layer, an overcoat 204, and a lubricant 202. The overcoat 204 is formed to meet tribological requirements such as contact-start-stop (CSS) performance and corrosion protection. Materials usually utilized for the overcoat layer 204 include carbon-based materials, such as hydrogenated or nitrogenated carbon. A lubricant 202 is placed over the overcoat layer 204 to further improve tribological performance. Exemplary lubricants include a perfluoropolyether or phosphazene lubricant or a composite thereof.

It has been discovered that certain dopants/segregation materials, such as carbon (resulting in FePtX:C), when added to a FePt-alloy of a hard magnetic recording layer results in small grain size, granular microstructure, high magnetocrystalline anisotropy ($K_u$), high coercivity ($H_c$), good texture and ordering, and lower ordering temperature, all of which are desirable properties for HAMR media. For example, adding 30-40% C to FePt (grown directly on an interlayer comprising MgO) gives provides a magnetic recording layer having a grain size (6-8 nm) and a lower $L1_0$ ordering (deposition) temperature.

It has been discovered that by using small grain size <7 nm and high magnetocrystalline anisotropy (Ku) $L1_0$ ordered FePt media, areal densities beyond 1 Tbits/in$^2$ can be achieved magnetic recording. It has also been discovered that the formation of small grain size, good texture, high coercivity ($H_c$), high anisotropy constant ($K_u$), narrow switching field distribution, low media roughness, high thermal conductivity, and good corrosion in low dopant content hard magnetic layer (e.g., FePt:C; or FePt:oxide) can be induced by utilizing a proper interlayer. For example, to achieve high coercivity ($H_c$), granular structure and small grain size FePt hard magnetic recording layer, MgO thin film has typically been used as an interlayer grown on top of the amorphous seed layers, heatsink layer and soft magnetic underlayer (SUL).

Unfortunately, MgO suffers from some drawbacks such as low deposition rate (~1-2 Å/kW·s), low thermal conductivity, poor corrosion properties, large grain size (~8-20 nm), and large $\Delta\theta_{50}$ characteristics (i.e., FWHM is >15°) causing large c-axis dispersion of ordered FePt film.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Various embodiments provide a recording medium comprising a magnetic recording layer; a barrier layer disposed under the magnetic recording layer; a first underlayer disposed under the barrier layer, wherein the first underlayer comprises RuAl-oxide, NiAl, FeAl, AlMn, CuBe, or AlRe; and an amorphous seedlayer disposed under the first underlayer. A recording medium in accordance with some embodiments may be utilized in a heat-assisted magnetic recording (HAMR) medium, where the first underlayer permits for areal density >900 Gb/in$^2$ while achieving small grain size (e.g., ~7 nm), high coercivity ($H_c$), good grain segregation, and good corrosion resistance. For example, the use of a RuAl-oxide underlayer in conjunction with a magnetic recording layer comprising FePt:C or FePt:oxide media can achieve very small grain size suitable for areal density >900 Gb/in$^2$, good $L1_0$ ordering, high coercivity ($H_c$), and good epitaxial grain growth. The recording medium of some embodiments may also allow for an underlayer rate suitable for purposes of mass production (e.g., up to 50 times faster than deposition of MgO).

For some embodiments, a barrier layer may be disposed between the magnetic recording layer and the first underlayer to promote a one-to-one epitaxial grain growth from the first underlayer to the magnetic recording layer. For instance, to avoid strong inter-diffusion between a first underlayer (e.g., comprising RuAl-oxide, NiAl, FeAl, AlMn, CuBe, or AlRe) and a magnetic recording layer comprising FePt, some embodiments may dispose a TiC barrier layer (e.g., via DC sputtering process) between the magnetic recording layer and the first underlay, thereby promoting a one-to-one epitaxial grain growth from the (RuAl-oxide, NiAl, FeAl, AlMn, CuBe, or AlRe) underlayer to the FePt magnetic recording layer. Additionally, for some embodiments, by forming an oxide at the grain boundary of a RuAl-oxide underlayer, lateral heat flux/diffusion resulting from heat applied over the magnetic recording layer (e.g., during a HAMR write operation) may be stopped or reduced. Rather than diffusing laterally, the heat flux can dissipates vertically through the RuAl-oxide underlayer to a heatsink layer. With vertical dissipation through the RuAl-oxide underlay, various embodiments can improve thermal gradient, which results in smaller jitter (i.e., sharper magnetic transitions). The smaller jitter may permit HAMR storage devices that include recording media of certain embodiments to better target and heat particular magnetic grains of the recording medium during HAMR write operations. The vertical heat diffusion may also be a feature of embodiments where the underlayer comprises NiAl, FeAl, AlMn, CuBe, or AlRe.

For some embodiments, the recording medium may comprise: a magnetic recording layer including FePt alloy, a CoPt alloy, or a FePd alloy; a barrier layer including MgO, TiC, TiN, CrN, TiCN, β-WC, TaC, HfC, ZrC, VC, NbC, or NiO; a first underlayer including RuAl-oxide, NiAl, FeAl, AlMn, CuBe, or AlRe; or an amorphous seedlayer including a Cr—X alloy, where X comprises Al, B, C, Cu, Hf, Ho, Mn, Mo, Ni, Ta, Ti, V, W, or Ru. The magnetic recording layer may have a $L1_0$ crystal structure. Additionally, for some embodiments the FePt alloy may be a FePt—XY alloy, the CoPt alloy may be CoPt—XY alloy, or the FePd alloy may be a FePd—XY alloy, such that X comprises $Cr_2O_3$, $SiO_2$, $TiO_2$, $Al_2O_3$, $Ta_2O_5$, $ZrO_2$, $Nb_2O_5$, $V_2O_5$, MgO, MnO, $WO_3$, or $HfO_2$, and where Y comprises Ni, Cu, Ag, Mn, B, or C. Further, the barrier layer may comprise a material having a B1 structure. The recording medium may further comprise a second underlayer disposed between the first underlayer and the amorphous seedlayer, the second underlayer including a RuAl alloy. The recording medium may further comprise a heatsink layer disposed under the amorphous seedlayer.

Figure 3:
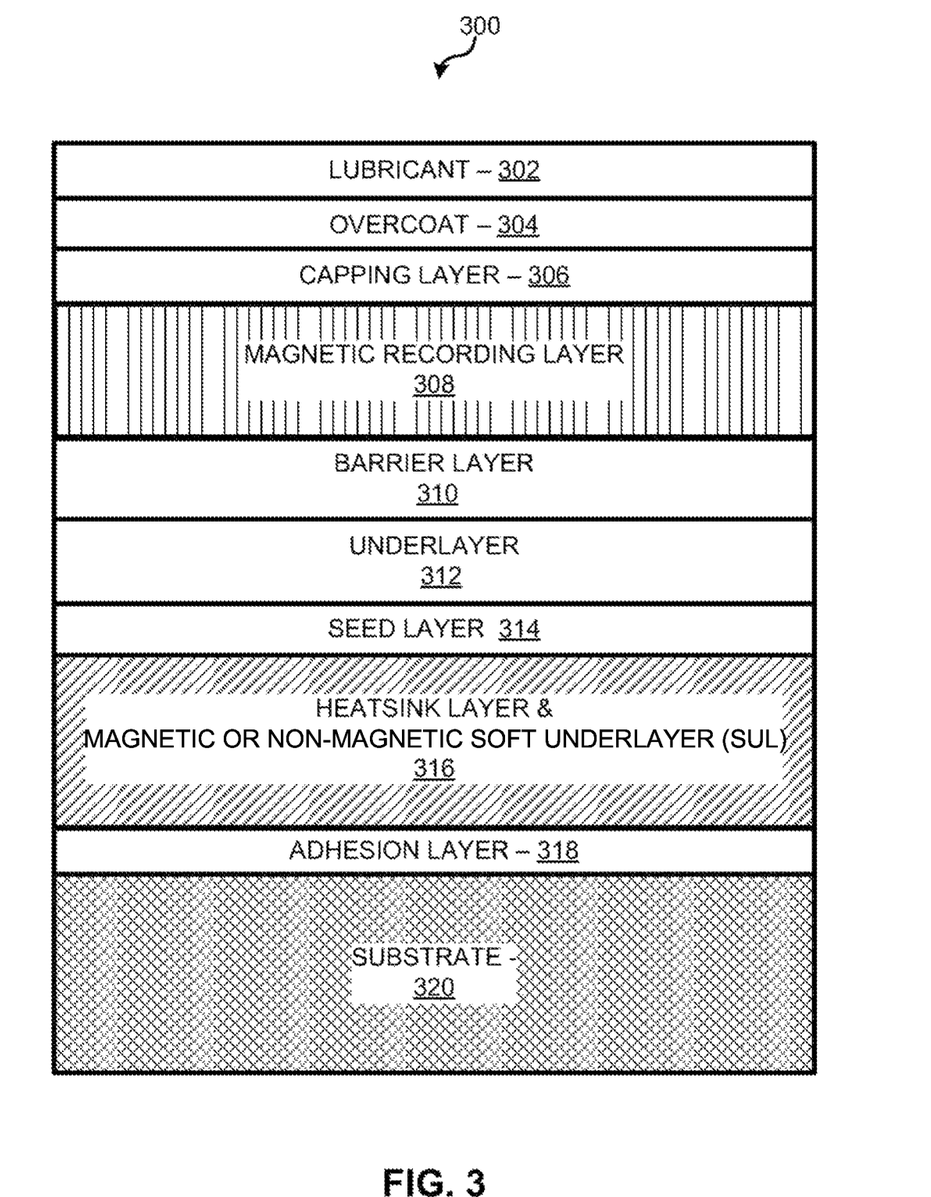
FIG. 3 illustrates a cross-sectional view of an exemplary heat-assisted magnetic recording (HAMR) media structure comprising an underlayer in accordance with some embodiments.

FIG. 3 illustrates a cross-sectional view of an exemplary heat-assisted magnetic recording (HAMR) media structure 300 comprising an underlayer 312 (e.g., comprising RuAl-oxide, NiAl, FeAl, AlMn, CuBe, or AlRe) in accordance with some embodiments. The media structure 300 comprises a substrate 320, which may be for example, a glass, a metal, and/or a metal alloy material. In a particular embodiment, substrate 320 is disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used.

Generally, the HAMR media structure 300 comprises thin films 50 nm or thicker. However, film thickness and residual stresses are known to create a driving force that causes film delamination from substrate. The adhesion layer 318 is used to reduce such delamination issues and improve overall film flatness in the heat-assisted magnetic recording (HAMR) media structure 300.

The soft magnetic underlayer (SUL) and heatsink layer 316 are disposed over adhesion layer 302. Generally, a SUL may include any materials known in the art. A SUL may be a laminate or multilayer stack of a plurality of soft magnetic layers separated by nonmagnetic or antiferromagnetic films. In one exemplary embodiment, the SUL includes a synthetic antiferromagnet (SAF) structure comprising two amorphous soft ferromagnetic layers (e.g., CoTaZr or CoFeTaZr, etc.) antiferromagnetically coupled with one another across a spacer layer (e.g. ruthenium (Ru)) there-between. The thickness of a SUL may generally range between 5 nm and 60 nm. In some embodiments, the SUL omitted from the media structure.

Layer 316 also comprises a heatsink layer. Although the illustrated embodiment depicts the heatsink layer with the SUL in layer 316, it should be appreciated that the heatsink layer may be disposed in various locations and arrangements within layer 316 between the SUL, substrate 320. In some embodiments, the heatsink comprises Cu, CuZr, Ag, Au, W, Ru, or CuTi.

Regardless of its position within the media structure, the heatsink layer is a metal or other heat conductive material. In the exemplary embodiment, the heatsink layer (i.e., in layer 316) may be made of copper (Cu) and may have a thickness between 10 nm and 100 nm. The heatsink layer specifically facilitates heat transfer for the HAMR media. The heatsink layer may also be useful in alternative embodiments in accordance with the present invention, including thermally assisted magnetic recording (TAMR) or optically assisted magnetic recording (OAMR).

Disposed over heatsink layer and SUL 316 is a seed layer 314, The seed layer 314, which may be amorphous, assists in the formation (i.e., growth) of the underlayer 312 disposed over the seed layer 314. In some embodiments, seed layer 314 may comprise Cr—X alloy, where X may be Al, B, C, Cu, Hf, Ho, Mn, Mo, Ni, Ta, Ti, V, W, or Ru, or some combination thereof. Other example seed layers may comprise amorphous AlTa, amorphous CrTa, AlTi, NiTa, or CrTi.

The underlayer 312 is disposed over seed layer 314 and may have a (002) crystal structure, small grain size, and a texture with a good epitaxial relationship with seed layer 314. As noted herein, deposition of the underlayer 312 may be faster than the deposition of MgO-based layer, making underlayer based on RuAl-oxide, NiAl, FeAl, AlMn, CuBe, or AlRe more suitable for mass production than a MgO-based one. Additionally, for some embodiments, the underlayer 312 is configured such that heat flux resulting from the application of heat over the magnetic recording layer (e.g., during a HAMR write operation) may dissipate through the underlayer 312 vertically rather than laterally. More with regard to heat dissipation is discussed below with respect to FIG. 4, which illustrates heat distribution through a cross section of an exemplary heat-assisted magnetic recording (HAMR) media structure in accordance with some embodiments.

Disposed between the underlayer 312 and a magnetic recording layer 308 is a barrier layer 310, which can reduce inter-diffusion between the underlayer 312 and magnetic recording layer 308. In doing so, various embodiments can prevent the reduction of magnetocrystalline anisotropy of the magnetic recording layer 308. In some embodiments, the barrier layer 310 may comprise MgO, TiC, TiN, CrN, TiCN, β-WC, TaC, HfC, ZrC, VC, NbC, or NiO.

Figure 4:
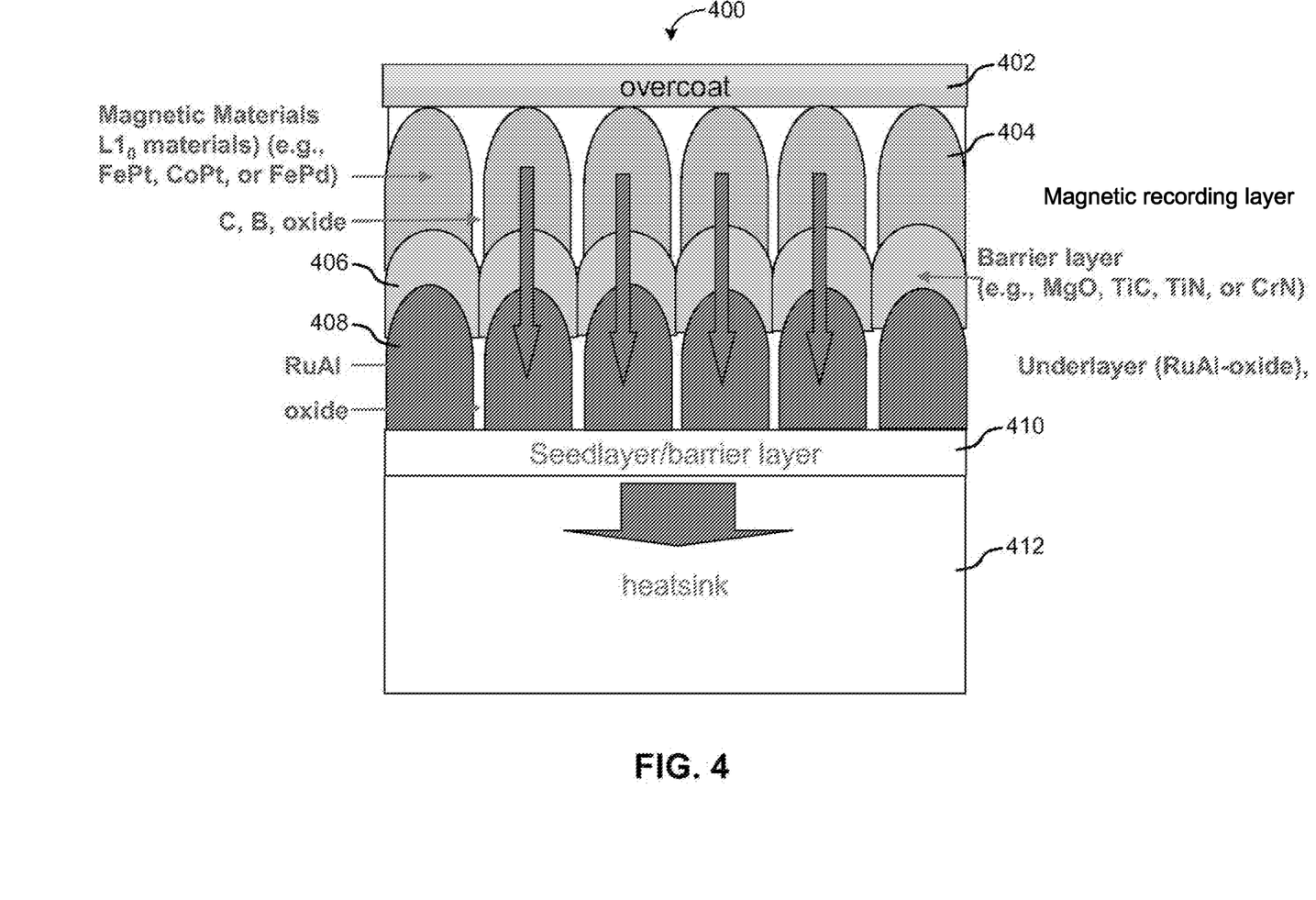
FIG. 4 illustrates heat distribution through a cross section of an exemplary heat-assisted magnetic recording (HAMR) media structure comprising a RuAl-oxide based underlayer in accordance with some embodiments.

Continuing with reference to FIG. 4, above the barrier layer 310 is the magnetic recording layer 308. In some embodiments, magnetic recording layer 308 comprises a FePt alloy or a CoPt alloy having a $L1_0$ crystal structure. Where a FePt-alloy or a CoPt-alloy is used for recording layer 308, the alloy may be a FePt—X alloy or the CoPt alloy is a CoPt—X alloy, where X comprises $Cr_2O_3$, $SiO_2$, $TiO_2$, $Al_2O_3$, $Ta_2O_5$, $ZrO_2$, $Nb_2O_5$, $V_2O_5$, MgO, MnO, $WO_3$, $HfO_2$, Ni, Cu, Ag, Mn, B, or C. In further embodiments, magnetic recording layer 505 may comprise a FePt-alloy doped with either carbon (i.e., FePtX:C) or an oxide (FePtX:oxide). For example, recording layer 505 may comprise FePtX:C, where suitable materials X may include Ag, Au, B, Cu, Ir, Nb, Ni, Ti, W, or Zr. Typically, a magnetic recording layer comprising a FePt:C, a FePt:

oxide, or an alloy thereof, has good $L1_0$ ordering, high coercivity Hc (>20 kOe), and small grain size.

Disposed over the magnetic recording layer 308 are a capping layer 306, an overcoat 304, and a lubricant 302. The capping layer 306 is disposed over the magnetic recording layer 308, and may comprise a based soft magnetic alloy comprising Al, B, C, Cr, Cu, N, Nb, Ni, Re, Ru, Si, Ta and/or Zr.

The overcoat 304 is formed on top of the capping layer 306 to meet tribological requirements such as contact-start-stop (CSS) performance and corrosion protection. Materials usually utilized for the overcoat layer 304 include carbon-based materials, such as hydrogenated or nitrogenated carbon. A lubricant 302 is placed on top of the overcoat layer 304 to further improve tribological performance. Exemplary lubricants include a perfluoropolyether or phosphazene lubricant or a composite thereof.

FIG. 4 illustrates heat distribution through a cross section of an exemplary heat-assisted magnetic recording (HAMR) media structure 400 comprising a RuAl-oxide based underlayer in accordance with some embodiments. The media structure 400 comprises an overcoat 402, a magnetic recording layer 404, a barrier layer 406, a RuAl-oxide underlayer 408, a seedlayer/barrier layer 410, and a heatsink 412. As illustrated, for some embodiments, the use of the RuAl-oxide underlayer 408 in conjunction with the barrier layer 406 causes a vertical heat dissipation, rather than lateral heat flux.

Figure 5:
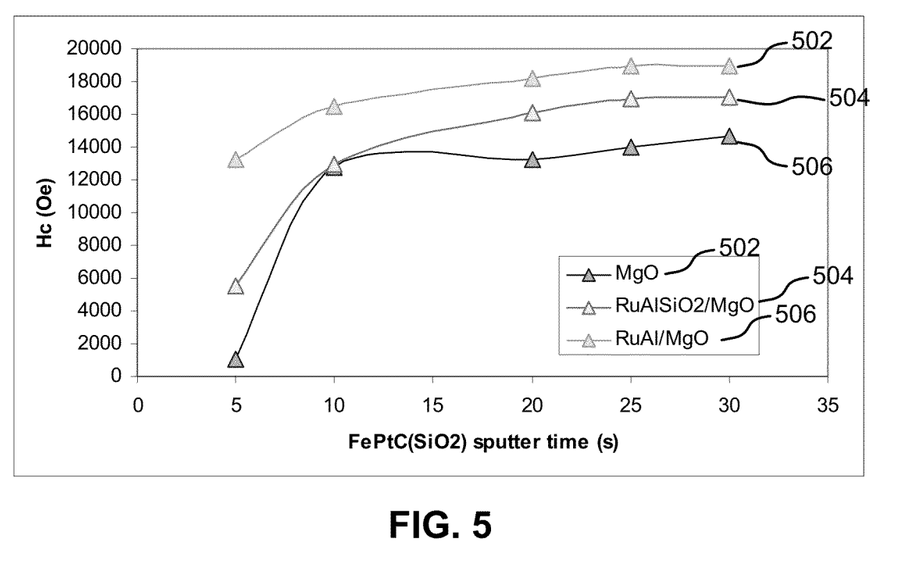
FIG. 5 provides a chart illustrating exemplary performance of using an underlayer in accordance with some embodiments.

FIG. 5 provides a chart illustrating exemplary performance of using RuAl-oxide based underlayer in accordance with some embodiments. In particular FIG. 5 illustrates coercivity ($H_c$) versus magnetic layer thickness data for an embodiment 504, comprising a $RuAlSiO_2$ underlayer and MgO barrier layer disposed between a magnetic recording layer and an amorphous seed layer. The chart compares the data of the embodiment 504 with those of a recording medium 502, comprising only a MgO barrier layer disposed between a magnetic recording layer and an amorphous seed layer, and another recording medium 506, comprising a RuAl underlayer and a MgO barrier layer disposed between a magnetic recording layer and an amorphous seed layer. The data from the chart suggests that, for some embodiments, very high $H_c$ can be achieved for the while maintaining good microstructure.

Figure 6:
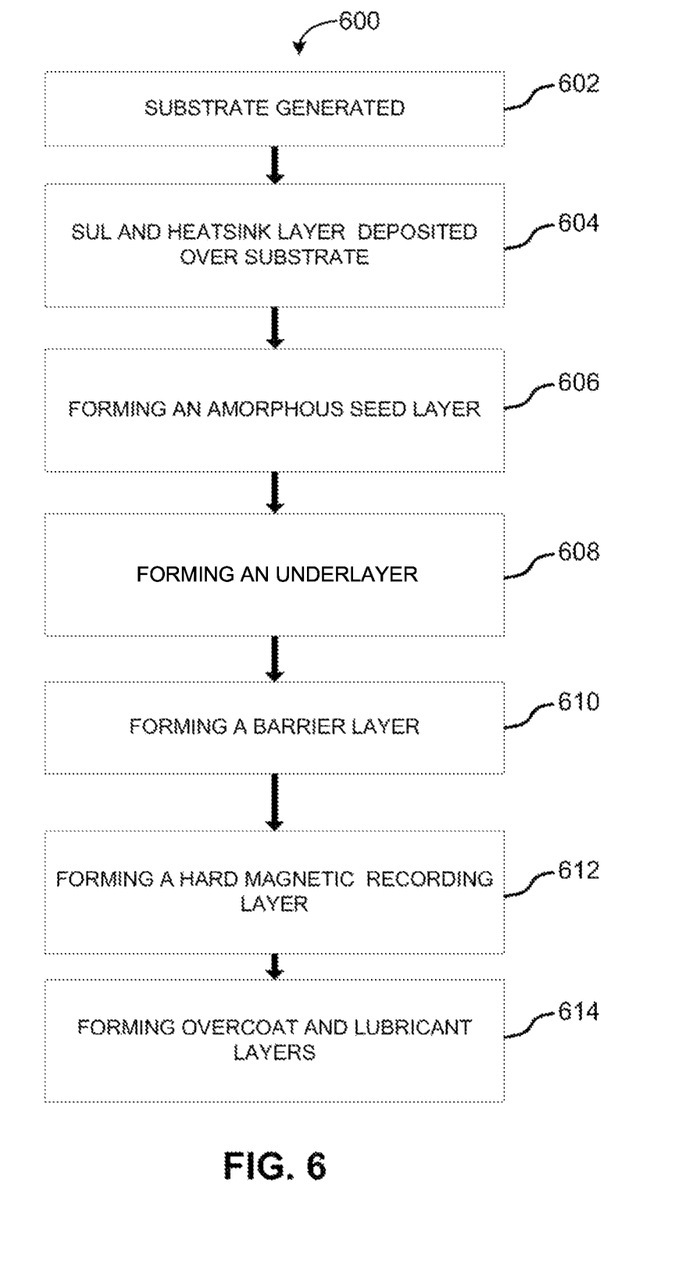
FIG. 6 illustrates an exemplary method of manufacturing a heat-assisted magnetic recording (HAMR) media using an underlayer in accordance with some embodiments.

FIG. 6 illustrates an exemplary method 600 of manufacturing a heat-assisted magnetic recording (HAMR) media using an underlayer in accordance with some embodiments. A substrate (e.g., 320) is first generated, or otherwise provided, at operation 602. The generation of a substrate for a magnetic recording disk is per se known in the art; accordingly a detailed discussion is not provided.

At operation 604, a (magnetic or non-magnetic) soft underlayer (SUL) (e.g., in layer 316) and a heatsink layer (e.g., in layer 316) is deposited over the substrate. Any conventional deposition method configured for the formation of the SUL may be utilized, such as sputter deposition (i.e., physical vapor deposition (PVD). The heatsink layer facilitates heat-assisted perpendicular magnetic recording. In some embodiments, an adhesion layer (e.g., 318) may be deposited above the substrate before the SUL and the heatsink layer are deposited.

At operation 606, a seed layer (e.g., 314) is formed over the SUL and the heatsink layer. As discussed herein, the seed layer, which may be amorphous, assists in the formation of the RuAl-oxide underlayer that follows. The seed layer may comprise Cr—X alloy, where X may be Al, B, C, Cu, Hf, Ho, Mn, Mo, Ni, Ta, Ti, V, W, or Ru, or some combination thereof.

Subsequently, at operation 608, an underlayer (e.g., 312) is formed over the seed layer. The underlayer may comprise RuAl-oxide, NiAl, FeAl, AlMn, CuBe, or AlRe. As discussed herein, a RuAl-oxide based underlayer generally has a texture having a good epitaxial relationship with the seed layer (e.g., 314) (i.e., to promote the formation of the RuAl alloy layer), a (002) crystal structure, and small grain size.

The formation of the underlayer is followed by operation 610, where a barrier layer (e.g., 310) is formed over the underlayer. As discussed herein, the barrier layer may comprise MgO, TiC, TiN, CrN, TiCN, β-WC, TaC, HfC, ZrC, VC, NbC, or NiO.

The method 600 continues with operation 612, where a magnetic recording layer (e.g., 308) is formed over the barrier layer (e.g., 310). Depending on the embodiment, the magnetic recording layer may comprise a FePt alloy or a CoPt alloy. For example, magnetic recording layer may comprise a FePt—X alloy or a CoPt—X alloy, where X comprises $Cr_2O_3$, $SiO_2$, $TiO_2$, $Al_2O_3$, $Ta_2O_5$, $ZrO_2$, $Nb_2O_5$, $V_2O_5$, MgO, MnO, $WO_3$, $HfO_2$, Ni, Cu, Ag, Mn, B, or C. In another example, magnetic recording layer may comprise a FePt:C or a FePt:oxide.

Lastly, in operation 614, a capping layer (e.g., 306), an overcoat layer (e.g., 304), and a lubricant layer (e.g., 302) are formed over the magnetic recording layer (e.g., 308).

As disclosed herein, the capping layer may comprise a soft magnetic alloy, where the soft magnetic alloy may contain: Al, B, C, Cr, Cu, N, Nb, Ni, Re, Ru, Si, Ta and/or Zr. The overcoat layer is formed on top of the capping layer to meet tribological requirements such as contact-start-stop (CSS) performance and corrosion protection. Materials for the overcoat layer may, for example, comprise carbon-based materials, such as hydrogenated or nitrogenated carbon. The lubricant layer is placed on top of the overcoat layer, for example by dip coating or spin coating, to further improve tribological performance. Example lubricants include a perfluoropolyether or phosphazene lubricant or a composite thereof.

Figure 7:
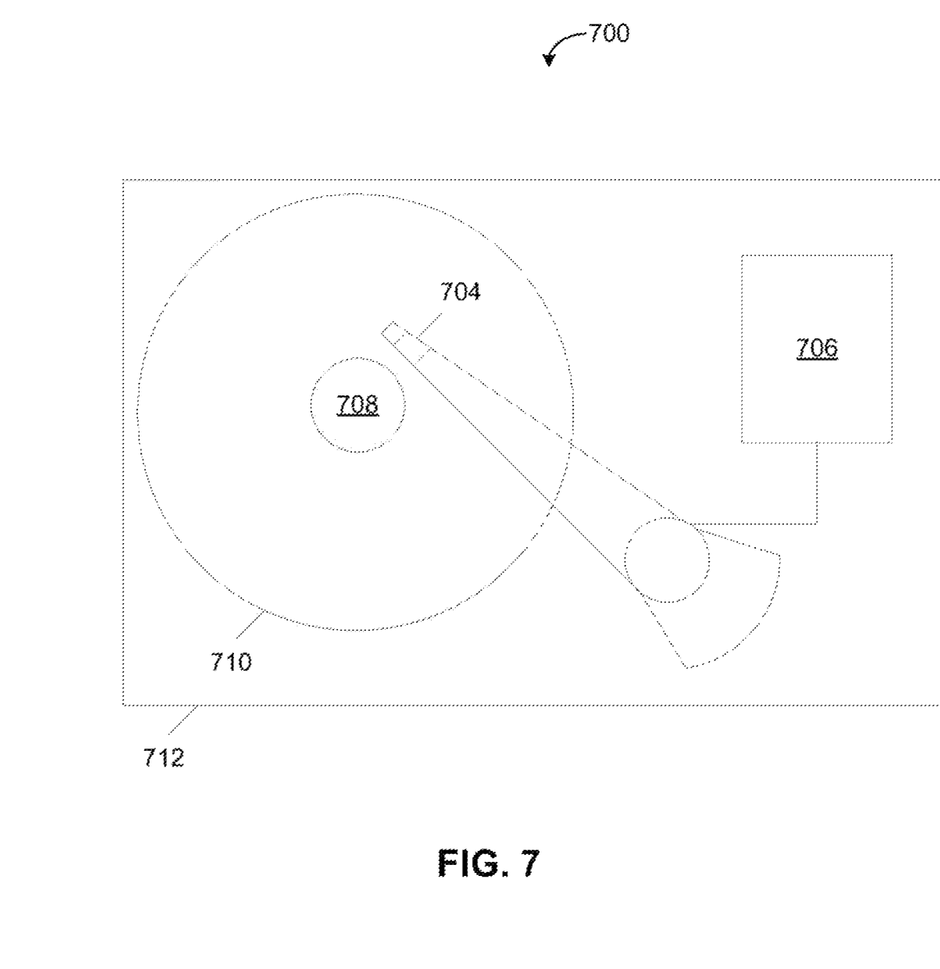
FIG. 7 illustrates an exemplary disk drive including a recording media structure in accordance with some embodiments.

FIG. 7 illustrates an exemplary disk drive 700 including recording media structure in accordance with some embodiments. The disk drive 700 may include one or more disks, comprising the recording media structure, to store data. The disks 710 reside on a spindle assembly 708 that is mounted to drive housing 712. Data may be stored along tracks in the magnetic recording layer of one of the disks 710. The reading and writing of data is accomplished with the head 704 that has both read and write elements. The write element is used to alter the properties of the magnetic recording layer of disks 710. In some embodiments, the recording media structure of disks 710 may be similar to that the structure depicted in FIG. 3 or the structure depicted in FIG. 4. In various embodiments, the disk drive 700 may a heat assisted recording medium (HAMR) drive, and the head 704 may be suitable for heat assisted recording medium (HAMR) operations. A spindle motor (not shown) rotates the spindle assembly 708 and, thereby, disks 710 to position the head 704 at a particular location along a desired disk track. The position of the head 704 relative to the disks 710 may be controlled by position control circuitry 706.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium comprising:
   a magnetic recording layer;
   a barrier layer consisting of TiC disposed under the magnetic recording layer;
   a first underlayer disposed under the barrier layer; and
   an amorphous seedlayer disposed under the first underlayer;
   wherein the magnetic recording layer comprises a FePd alloy;
   wherein the first underlayer comprises RuAl-oxide, AlMn, CuBe, or AlRe.

2. The recording medium of claim 1, further comprising a heatsink layer disposed under the amorphous seedlayer.

3. The recording medium of claim 1, wherein the magnetic recording layer has a $L1_0$ crystal structure.

4. The recording medium of claim 1, wherein the FePd alloy is a FePd—XY alloy, where X comprises $Cr_2O_3$, $SiO_2$, $TiO_2$, $Al_2O_3$, $Ta_2O_5$, $ZrO_2$, $Nb_2O_5$, $V_2O_5$, MgO, MnO, $WO_3$, or $HfO_2$, and where Y comprises Ni, Cu, Ag, Mn, B, or C.

5. The recording medium of claim 1, wherein the amorphous seedlayer comprises a Cr—X alloy, where X comprises Al, B, C, Cu, Hf, Ho, Mn, Mo, Ni, Ta, Ti, V, W, or Ru.

6. The recording medium of claim 1, wherein the recording medium is included in a recording device comprising a housing containing a recording head and the recording medium, the recording head for reading magnetic signals from, and writing magnetic signals to, the recording medium.

7. The recording medium of claim 1, wherein the barrier layer comprises a material having a B1 structure.

* * * * *